Patented May 10, 1927.

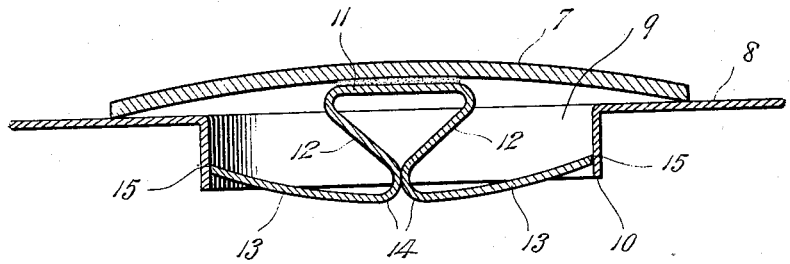
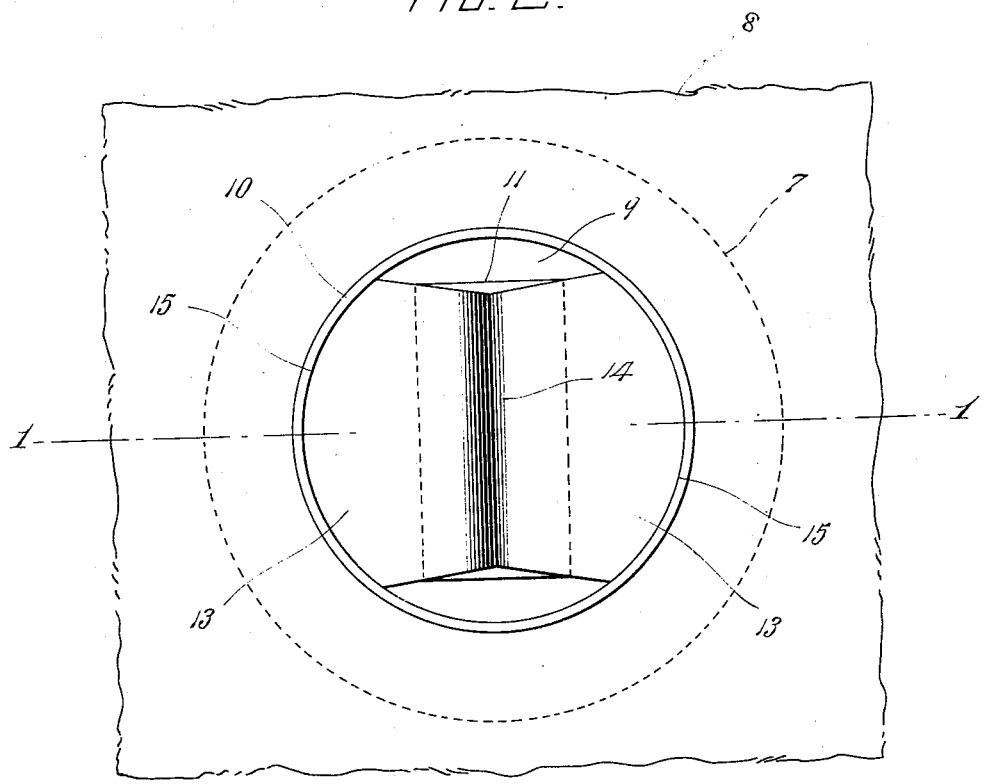

1,627,802

UNITED STATES PATENT OFFICE.

DE WITT T. MOATS, OF COLUMBUS, OHIO.

ATTACHING MEANS.

Application filed November 12, 1926. Serial No. 147,997.

The present invention relates to means for attaching together plates and other objects, for example, for attaching the name plate of an automobile to the radiator shell, and aims to provide a novel and improved gripping device secured to or carried by one object or plate to enter an opening or hole in another object or plate for securely fastening said objects or plates together.

Another object of the invention is the provision of an attaching device of the kind indicated which is of novel construction and which is adapted to have an effective gripping action within a hole or aperture.

A further object is the provision of such a device which is simple in construction and manufacture and which is advantageous in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a diametrical section showing the device in place, the section being taken on the line 1—1 of Fig. 2.

Fig. 2 is a rear view thereof.

As illustrated in the drawing the attaching device is employed for securing a name plate 7 of an automobile to the shell 8 of the radiator, although it will be understood that the device may be used for attaching together other parts or objects for which the device is suitable. For example, the device may be used for attaching name or label plates to machinery, refrigerators, radio cabinets, sound reproducing cabinets, soda fountains, etc. The shell or object 8 has an opening or hole 9 which is of circular form as shown, surrounded by a cylindrical inturned flange 10. However, it will be understood that the device may be used in holes of objects composed of wood, fibre, and other hard material, as well as in metal.

The attaching device is made from a single blank or piece of sheet metal, which may be of comparatively thick stock if desired. The sheet metal or piece from which the device is formed is bent into shape, which can be readily done so that the device is inexpensive to manufacture. The device has the intermediate portion 11 which is welded, soldered or otherwise attached to the rear surface of the name plate or object 7 which is to be attached to the object 8 across the opening 9. The attaching device has converging portions 12 projecting from the portion 11, and has the portions or dogs 13 bent away from one another and extending in opposite directions from the adjacent ends of the portions 12, the bends 14 between the portions 12 and 13 preferably contacting with one another under the tendency of the portions 13 to spring toward one another. The portions 11 and 12 provide a loop of triangular form between the terminal portions 13. The portions or dogs 13 are bent toward the plane of the intermediate portion 11 and object 7, and therefore diverge in a direction toward the object 7 from their adjacent ends to their opposite or free ends. The free ends 15 of the portions or dogs 13 are curved to conform to the curvature of the wall of the opening 9, thereby permitting the object 7 to be turned to the desired position in attaching it to the object 8, although it will be apparent that the opening 9 and ends 15 of the portions 13 may be of any other suitable shape.

The portions 12 and 13 being bent in reverse directions will render the portions or dogs 13 resilient in an effective manner, and the attaching device may therefore be made of sheet metal of comparatively large gage and still possess sufficient resilience.

The circle defined by the free ends 15 of the portions 13 is of slightly greater diameter than the diameter of the opening 9, so that in placing the object 7 against the object 8, the device in being forced into the opening 9, will cause the portions 13 to be sprung toward the object 7. Therefore, the device is brought under strain in shoving same into the opening, the free terminals of the portions 13 being sprung away from a straight line and tending to spring back toward said straight line with a toggle action. The free ends of the portions 13 thus grip or bite the wall of the opening 9 to securely hold the object 7 in place against the object 8 across the opening 9. Any tendency for the object 7 to be removed from the object 8 is resisted due to the fact that the combined length of the portions or dogs 13 is greater than the diameter of the opening 9, and an outward pull on portions 11 and 12 will have a tendency to move the adjacent ends of the portions 13 out of the opening, and the bends 14 contacting with one another will prevent such action.

In addition to the advantages already pointed out, the attaching device has other advantages. It does not entirely seal or close the opening 9, thereby permitting ventilation in said opening and past the device, to prevent the moisture from collecting, such as might result in the parts becoming rusted. The portions 12 and 13 permit the device to be readily suspended during the plating of the object 7, and the plating solution may also be readily drained from the device after the plating operation. The device may also be made in small sizes for buttons or other small objects, and the device will operate in bored, turned, punched and other openings. Furthermore, the openings need not be smooth or true to size, and the portions 13 will conform to irregularities in the opening if it is not perfectly true or smooth. The device is readily formed, without requiring a drawing operation, and may be readily bent out of cold rolled steel.

Having thus described the invention, what is claimed as new is:—

1. The combination with an object to bear against another object across an opening therein, of a resilient device carried by the first named object having converging portions projecting from the first named object and having portions extending away from one another from said converging portions and adapted to be sprung toward the first named object when entering said opening so that their ends engage and bite the wall of the opening and resist movement out of the opening.

2. The combination with an object to bear against another object across an opening therein, of a resilient device carried by the first named object and having converging portions projecting from said first named object and having portions extending from said converging portions and bent to project away from one another, with bends between the first named and second named portions contacting with one another, the second named portions diverging toward the first named object and being adapted to be sprung toward the first named object when entering said opening so that their ends engage and bite the wall of the opening and resist movement out of the opening.

3. The combination with an object to bear against another object across an opening therein, of a resilient member having an intermediate portion secured to the first named object, having converging portions projecting from said intermediate portion, and having other portions extending from said converging portions away from one another and adapted to be sprung toward the first named object when entering said opening so that their ends engage and bite the wall of the opening and resist movement out of the opening.

4. The combination with an object to bear against another object across an opening therein, of a resilient member having an intermediate portion secured to the first named object, having converging portions projecting from said intermediate portion, and having portions extending from said converging portions and bent to project away from one another, with bends between the converging and last named portions contacting with one another, the last named portions diverging toward the first named object and being adapted to be sprung toward the first named object when entering said opening so that their ends engage and bite the wall of the opening and resist movement out of the opening.

5. The combination with an object to bear against another object across an opening therein, of a resilient member having terminal portions and a loop between them secured to the first named object, said terminal portions extending away from one another and being adapted to be sprung toward the first named object when entering said opening so that their ends engage and bite the wall of said opening and resist movement out of the opening.

In testimony whereof I hereunto affix my signature.

DE WITT T. MOATS.